(12) United States Patent
Wright et al.

(10) Patent No.: US 6,422,857 B2
(45) Date of Patent: *Jul. 23, 2002

(54) INJECTION GATE INSULATING AND COOLING APPARATUS

(75) Inventors: Paul L. Wright, Aurora; Richard P. Nightingale, Woodstock, both of IL (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,154

(22) Filed: Jun. 29, 2001

Related U.S. Application Data

(63) Continuation of application No. 09/457,547, filed on Dec. 9, 1999, now Pat. No. 6,264,460.

(51) Int. Cl.[7] ............................................. B29C 45/20
(52) U.S. Cl. .................................. 425/549; 264/328.15
(58) Field of Search ....................... 425/549; 264/328.15

(56) References Cited

U.S. PATENT DOCUMENTS

| | | |
|---|---|---|
| 3,707,265 A | 12/1972 | Seres |
| 3,800,027 A | 3/1974 | Tsutsumi |
| 4,279,588 A | 7/1981 | Gellert |
| 4,306,852 A | 12/1981 | Mateev et al. |
| 4,344,750 A | 8/1982 | Gellert |
| 4,521,179 A | 6/1985 | Gellert |
| 4,981,431 A | 1/1991 | Schmidt |
| 5,208,052 A | 5/1993 | Schmidt et al. |
| 5,299,928 A | 4/1994 | Gellert |
| 5,324,191 A | 6/1994 | Schmidt |
| 5,443,381 A | 8/1995 | Gellert |
| 5,474,439 A | 12/1995 | McGrevy |
| 5,494,433 A | 2/1996 | Gellert |
| 5,513,976 A | 5/1996 | McGrevy |
| 5,569,475 A | 10/1996 | Adas et al. |
| 5,674,439 A | 10/1997 | Hume et al. |
| 5,716,651 A | 2/1998 | McGrevy |
| 5,879,727 A | 3/1999 | Puri |
| 5,885,628 A | 3/1999 | Swenson et al. |
| 6,022,210 A | 2/2000 | Gunther |
| 6,264,460 B1 * | 7/2001 | Wright et al. ............... 425/549 |

* cited by examiner

Primary Examiner—Tim Heitbrink
(74) Attorney, Agent, or Firm—McDermott, Will & Emery

(57) ABSTRACT

An injection apparatus comprises a recessed injection gate allowing cooling ducts to be run proximate thereto and an extended nozzle configured to extend to the recessed injection gate. The apparatus also comprises an insulating and sealing insert positioned adjacent to the injection gate locating it between the nozzle and the injection cavity during injection to thermally insulate the injection gate from the nozzle and to prevent melt material from leaking between the nozzle and the gate. The insert also accommodates variations in the nozzle sizes to assure a tight seal at each nozzle.

27 Claims, 2 Drawing Sheets

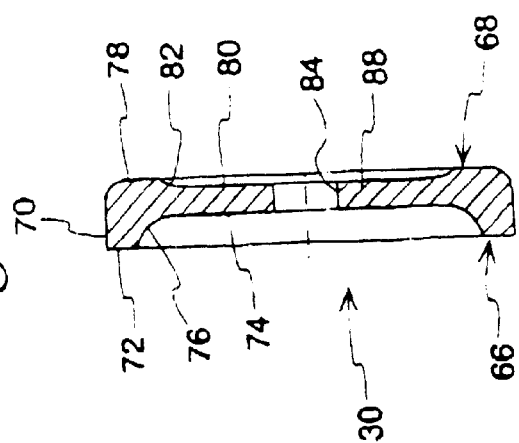
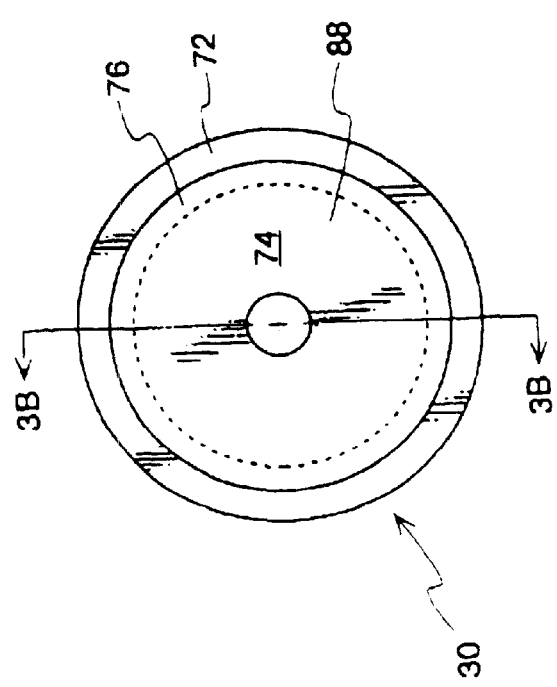
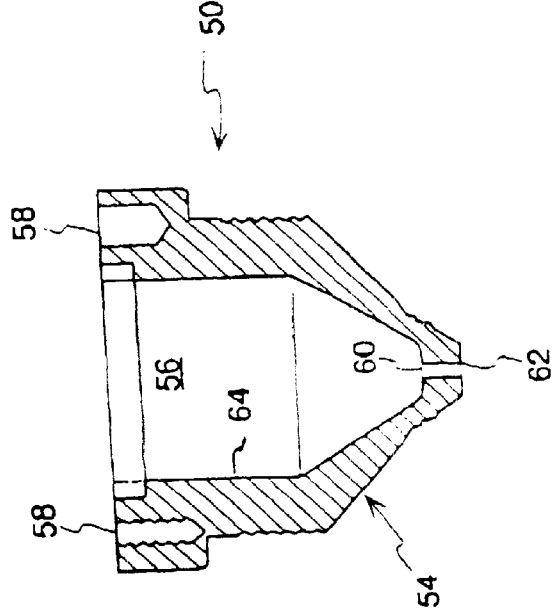

INJECTION GATE INSULATING AND COOLING APPARATUS

This application is a continuation of U.S. patent application Ser. No. 09/457,547, filed Dec. 9, 1999 now U.S. Pat. No. 6,264,460.

BACKGROUND OF THE INVENTION

1. Field of the Invention.

The present invention relates generally to an injection apparatus; particularly an injection apparatus maintaining the nozzle and the injection gate at respective desired temperatures.

2. Background of the Invention.

It has long been known that the temperature of a melt material is important to successful injection. This is particularly true when the melt material has a high melt temperature. For example, polyethylene terephthalate ("PET") is typically injected above 500° F. A drop in the temperature of the melt material prior to reaching the injection cavity would lower the melt material temperature below that required for proper melt material flow causing less than ideal flow characteristics. These flow characteristics can cause deformed or defectively molded parts; particularly when injecting multilayer parts comprising very thin layers. Therefore, it is desirable to maintain the nozzle temperature at or above the temperature required to assure proper melt material flow as the melt material leaves the nozzle.

It is also known to maintain an injection cavity at a temperature relatively low compared to the temperature of the melt material to facilitate quick cooling of the melt material upon reaching the cavity. The colder the cavity temperature at the time the melt material is injected, the faster the melt material will solidify and allow removal of the solidified part from the cavity. Therefore, a relatively lower cavity temperature will decrease the overall cycle time for injection molding a part. Moreover, it is known that if the injection gate temperature exceeds the desired temperature of the melt material, 'stringing' of the melt material will occur in the nozzle and gate area as the injected part is removed from the cavity after injection is complete. These 'strings' either break off with the injected part and interfere with further processing of the part (e.g. blowmolding) or stay in the gate or cavity and cause a physical or aesthetic defect in subsequently injected parts.

For these reasons, it has been found desirable to prevent excessive heat transfer from the injection nozzle to the injection cavity. The melt material can thus be maintained at its appropriate temperature in both the nozzle and the cavity. Prior injection apparatuses were often designed to space a nozzle tip from an associated injection cavity during injection to leave a gap therebetween. It was thought that this gap would act as a thermal break between the nozzle and the cavity and allow the nozzle to operate at high temperatures while maintaining a relatively cool cavity. Unfortunately, the thermal break of this configuration could not be maintained at efficient cycle times. During the injection process, melt material would deviate from the injection path and flow into the gap between the nozzle and the cavity. The thermal break thus became a thermal bridge.

Other attempts to insulate an injection nozzle from a cavity have involved the use of nozzle inserts. For example, U.S. Pat. No. 4,279,588 issued to Gellert and entitled "Hot Tip Seal" disclosed a seal (12) located between the nozzle and the injection gate to limit heat transfer therebetween. The seal (12) of Gellert resided substantially within the nozzle and extended outward therefrom to contact the cavity. Similarly, U.S. Pat. No. 4,521,179 issued to Gellert and entitled "Injection Molding Core Ring Gate System" disclosed a nozzle seal (76). The seal (76) of Gellert also resided substantially within the nozzle and extended outward therefrom to contact the cavity.

It has been found that movement of the various parts within an injection apparatus will result from thermal expansion as portions of the apparatus are heated from ambient temperature to the temperature necessary to inject a melt material. Different injection apparatuses accommodate this thermal expansion in different ways. It has been found that the thermal expansion of some injection apparatuses results in movement of the nozzle both along the longitudinal axis thereof and perpendicular to that longitudinal axis. In other words, it has been found that the nozzles of some apparatuses will elongate and shift laterally as the apparatus is heated. Seals that attached to the nozzle, such as those of the Gellert patents discussed above, break or deform due to this lateral nozzle movement. Such seals are therefore inapplicable to apparatuses experiencing this lateral nozzle movement.

It has also been found that many seals cannot withstand the high temperatures and pressures associated with injection; especially when the high temperatures are maintained for long periods of time. Many prior inserts degraded after prolonged exposure to high temperatures resulting in rupture or deformation of the inserts which allowed melt material to leak into the area between the nozzle and the cavity causing in a thermal bridge.

It has also been known to supply a cooling means to a cavity to remove the heat transferred from the nozzle or melt material to the cavity. Cooling ducts circulating coolants such as glycol were typically employed. However, the distance between the part void and the injection gate has heretofore limited the proximity of the cooling ducts to the injection gate.

SUMMARY OF THE INVENTION

It is one of the principal objectives of the present invention to provide an injection apparatus which will facilitate the injection of melt material at the appropriate melt temperature while allowing the cavity to remain cool to reduce cycle time.

It is another objective of the present invention to provide an injection apparatus in which the nozzle is thermally insulated from the cavity.

It is another objective of the present invention to provide an injection apparatus in which the injection flow path is sealed between the nozzle and cavity.

It is another objective of the present invention to provide an injection apparatus susceptible to lateral nozzle movement wherein the nozzle is thermally insulated from the cavity.

It is another objective of the present invention to provide an injection apparatus susceptible to lateral nozzle movement wherein and the injection flow path between the nozzle and cavity is sealed to prevent diversion or interruption of the flow path.

It is another objective of the present invention to provide an injection apparatus in which the injected parts cool quickly.

It is another objective of the present invention to provide an injection apparatus having a low cycle time.

It is another objective of the present invention to provide an injection apparatus which can maintain a desired melt material temperature and prevent stringing of the melt material.

It is still another objective of the present invention to provide an insert to limit heat transfer from a nozzle susceptible to lateral movement to an adjacent cavity.

BRIEF DESCRIPTION OF DRAWINGS

FIG. 2 is a cross sectional view of a retrofit nozzle tip according to the present invention.

FIG. 3A is a nozzle side elevational view of an insert according to the present invention.

FIG. 3B is a cross sectional view of the insert shown in FIG. 3A taken along line 3B—3B.

DETAILED DESCRIPTION OF THE DRAWINGS

Figure 1:
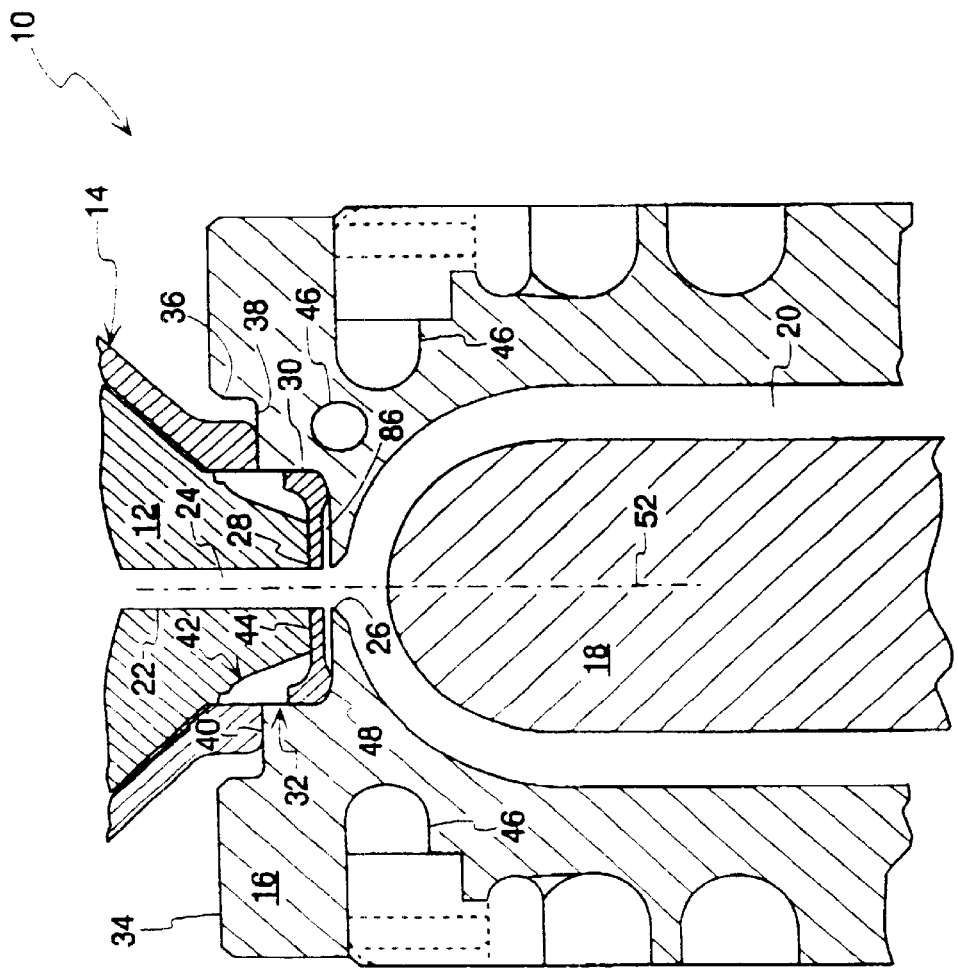
FIG. 1 is a cross sectional view of a single injection nozzle, an injection cavity and an insert of an injection molding apparatus according to the present invention.

In one embodiment of the present invention depicted in FIG. 1, the injection apparatus 10 comprises a nozzle 12, associated with an injection manifold 14 interfaced with an injection cavity 16 having a core 18 located therein to define a part void 20 therebetween into which melt material is injected to form the desired part. The nozzle may be part of an injection mold system comprising multiple nozzles 12 and associated injection cavities (not shown) such as that disclosed in U.S. Pat. No. 4,712,990 which is incorporated herein by reference in its entirety. An axial bore 22 runs along a longitudinal axis 52 of the nozzle 12 to define a melt material flow path 24 therein. A gate 26 is located in the injection cavity 16 and a bore opening 28 located at the end of the nozzle axial bore 22 is positioned to be substantially in axial alignment with the gate 26 to direct flow of melt material from the nozzle 12 through the gate 26 and into the part void 20 within the injection cavity 16. An insert 30 is located between the nozzle 12 and the injection cavity 16.

As depicted in FIG. 1, the gate 26 of the present injection apparatus 10 is located in a recess 32 from an upper surface 34 of the injection cavity 16. The recess 32 also comprises a diameter 36 and a land 38 against which an outer boss 40 of the injection manifold 14 may abut. A tip 42 of the nozzle 12 extends outward beyond the outer boss 40 of the injection manifold 14 to present a leading face 44 which comprises the bore opening 28 therein. The nozzle tip 42 is preferably frustoconical in shape such that the nozzle 12 narrows as it extends outward of the outer boss 40 to the leading face 44. The leading face 44 of the nozzle 12 therefore comprises a reduced surface area. Because the leading face 44 is the only portion of the nozzle 12 which contacts the insert 30, the heat transfer from the nozzle 12 to the injection cavity 16 is limited by this reduced surface area of the leading face 44. That is, because the rate of heat transfer is proportional to the surface area susceptible to thermal conduction, the allowed rate of heat transfer from the nozzle 12 to the injection cavity 16 is lowered by the reduced surface area of the leading face 44. Other nozzle tip configurations are also contemplated.

The recess 32 distances the gate 26 from the injection block upper surface 34 as depicted in FIG. 1 providing the injection cavity 16 with additional volume therebetween as compared to prior injection apparatuses in which injection gates were located at or near the injection block upper surface. This additional volume allows cooling facilities such as cooling ducts 46 to be located closer to the injection gate 26 than with those prior injection apparatuses. Because the part void 20 extends substantially radially from the axis 52 defined by the nozzle axial bore 22, sufficient injection cavity volume does not exist between a recess flat 48 and the part void 20 to locate the cooling ducts 46 immediately adjacent to the injection gate. However, the additional injection cavity volume provided by the recess 32 of the present invention allows the cooling ducts 46 to be placed just beyond the perimeter of the recess 32 facilitating a much closer proximity of the cooling ducts 46 to the injection gate 26 than obtained in prior injection apparatuses. The injection cavity volume necessary to locate cooling ducts proximate to an injection gate did not exist in those prior injection apparatuses. By way of example, if the additional injection cavity volume did not exist in the injection cavity 16 of the present invention, and the flat 48 of the embodiment of the present invention depicted in FIG. 1 were to extend across the injection cavity and thus represent an injection cavity upper surface, the cooling ducts depicted in FIG. 1 would be opened to the atmosphere and rendered useless. Thus, the additional injection cavity volume provided by the present invention allows the cooling ducts 46 to be placed proximate to the gate 26 to regulate its temperature.

To obtain the injection cavity 16 having additional volume according to the present invention, an entire new injection cavity may be manufactured according to existing manufacturing techniques known in the art. Alternatively, the recess 32 may be retrofitted onto an injection cavity not having such a recess. To accomplish a retrofitted injection cavity 16, material may be added to an existing injection cavity by welding or other known methods to build up the injection cavity around the gate. The recess 32 may then be bored, or otherwise machined, into the added material. Cooling ducts may be incorporated into the added material prior to attachment to the pre-existing injection cavity and configured to interact with the preexisting cooling ducts of the pre-existing injection cavity.

As discussed above, the nozzle tip 42 of the present invention extends outward beyond the injection manifold outer boss 40 toward the gate 26 in order to extend into the recess 32 and interface with the insert 30. This entire extended nozzle configuration may be accomplished by manufacture according to standard manufacturing techniques. Alternatively, the extended nozzle configuration may be accomplished by the addition of a retrofit to a previous nozzle configuration.

A nozzle retrofit 50 consistent with the present invention is depicted in FIG. 2. The nozzle retro-fit 50 comprises an outer shell 54 having a cavity 56 therein configured to accommodate a pre-existing nozzle and attachment means 58 to facilitate attachment of the nozzle retro-fit 50 to a pre-existing nozzle or other portion of a pre-existing injection apparatus. The nozzle retro-fit 50 further comprises a nozzle retro-fit axial bore 60 configured to align with the axial bore of a pre-existing nozzle such that a flow of melt material will pass through the nozzle axial bore to the nozzle retro-fit axial bore 60 and out of the nozzle retro-fit 50 at a nozzle retro-fit bore opening 62. An inner wall 64 of the nozzle retrofit 50 defines the nozzle retrofit cavity 56. The inner wall 64 may be configured to conform exactly to the outer contours of the pre-existing nozzle to which the nozzle retrofit will be attached. Alternatively, the inner wall 64 may be configured to have only limited contact with the pre-existing nozzle to limit heat conduction from the pre-existing nozzle to the nozzle retro-fit 50. In either configuration, the inner wall 64 may comprise additional means for attaching the nozzle retro-fit to the pre-existing nozzle which is exclusive of, or in addition to, the attachment means 58 depicted. It will be recognized, however, that the nozzle retrofit 50 should be secure and relative movement between the pre-existing nozzle and the nozzle retrofit 50 should be minimized. A seal (not depicted) may be placed between the pre-existing nozzle and the nozzle retrofit 50 to insure that melt material does not seep therebetween. It will also be recognized that sufficient heat must be conducted to the nozzle retrofit axial bore 60 to ensure that the proper melt material temperature is maintained during injection consistent with the objectives of the present invention.

The insert 30 of the present invention is positioned in the recess 32 interposed between the injection cavity 16 and the nozzle 12 as depicted in FIG. 1. The insert 30 insulates the injection gate 26 from the relatively high temperatures of the nozzle 12 in two manners. First, the insert 30 seals the space between the nozzle 12 and the injection cavity 16 to prevent melt material from accumulating therebetween and creating the thermal bridge experienced in the prior art. Second, the insert 30 may be comprised of a material that is low in thermal conductivity to minimize heat transfer from the nozzle 12 to the injection gate 26. In this configuration, heat conducted from the nozzle 12 to the injection gate 26 is conducted only through the insert 30 and may thus be regulated by the thermal conductivity of the insert 30. In this configuration, the present apparatus 10 thus differs from prior configurations in which the melt material accumulated between the nozzle and the injection cavity 16 allowing relatively free conduction of heat therebetween.

The insert 30 is preferably constructed of a material retaining a high structural integrity at high temperatures such as, by way of example only, the 500–550° F. at which PET is typically injected, such that the insert 30 maintains its shape and strength. The continued strength and shape of the insert 30 is important to insure that the seal between the nozzle 12 and the injection cavity 16 is maintained throughout prolonged operation of the injection apparatus 10. Distortion, cracking or rupture of the insert would allow the pressurized melt material to divert from the melt material flow path 24 and set between the nozzle 12 and the injection cavity 16, increasing the thermal conduction therebetween and disrupt the desired flow characteristics. It has been found that the material sold by DuPont under the trademark Vespel® provides the insert 30 with appropriate structural integrity to withstand injection of PET at temperatures of 500–550° F. while limiting thermal conductivity. Other materials including, but not limited to, titanium and stainless steel are also contemplated.

One embodiment of the insert 30 is depicted in FIGS. 3A and 3B. This embodiment of the insert 30 comprises an insert nozzle side 66, an insert cavity side 68 and an outer perimeter 70. The outer perimeter 70 of the insert 30 is depicted herein as annular. However, the outer perimeter 70 could comprise any shape. The insert nozzle side 66 comprises an outer ridge 72 and a central flat 74 with a radius 76 therebetween. The cavity side 68 of the depicted insert 30 comprises an outer land 78 and a central recess 80 with a radius 82 therebetween. An axial bore 84 is located centrally through the insert 30 to align with the nozzle axial bore 22 and extend the melt material flow path 24 toward the injection gate 26.

The insert cavity side 68 is designed to fit into the recess 32 of the injection block 16 so that the outer land 78 abuts the recessed flat 48 thereof. In one embodiment, the outer perimeter 70 of the insert 30 is designed to provide interference fit into the injection block recess 32. However, the insert 30 could be secured into the injection block recess 32 in other manners as will become evident to one of ordinary skill in the art. In either configuration, it is desirable that the insert 30 be removable to facilitate its replacement in the event that deterioration occurs. It is contemplated, however, that the insert 30 of the present invention may be employed in an injection apparatus which does not comprise the recess 32 of the present invention. The recess could be configured to be only as deep as the insert 30 to allow the recess 32 to retain the insert 30 within the injection cavity. Furthermore, the insert 30 of the present invention may be employed with an injection apparatus having no recess. Indeed, the insert 30 may be employed in any injection apparatus in which the insert may be sufficiently secured between the nozzle and the injection cavity to maintain substantial axial alignment of the insert axial bore 84 to the nozzle axial bore 22 and the injection gate 26 during injection.

As depicted in FIG. 3B, the insert central recess 80 is displaced inward of the outer land 78 such that when the outer land 78 abuts against the recessed flat 48, which is preferably substantially planar, a space 86 will remain between the insert central recess 80 and the recessed flat 48. This space 86 allows a flex portion 88 of the insert 30 (defined as the portion extending inward from the outer land 78) to flex under the force of a nozzle 12 contacting the nozzle side 66 of the insert 30. This configuration of the insert 30 allows the injection apparatus 10 of the present invention to accommodate nozzles of varying lengths or varying thermal expansion properties. In other words, variations in nozzle length caused by machining, assembly tolerances and variations in thermal expansion of the nozzles 12 can be absorbed by the flexible nature of the insert 30 which is afforded by the space 86.

The ability to accommodate variations in nozzle lengths is especially important when employing a multi-cavity injection system in which multiple nozzles are mounted on a single carriage operatively associated with a plurality of injection cavities. Such a system is described in U.S. Pat. No. 4,712,990. Regardless of the number of nozzles 12 employed by a multicavity injection apparatus, some nozzles 12, as discussed above, will likely protrude further than others due to tolerances so that upon approaching the injection cavity 16 (due to thermal expansion during warm-up of the injection apparatus 10), the longest nozzle 12 will encounter an associated insert 30 before contact occurs between other nozzles 12 and their associated inserts 30. Additionally, nozzles grouped in a single carriage (or manifold) will be subjected to different temperatures depending on, for example, their positioning on the carriage. Variations in nozzle thermal expansion result consistent with these temperature differentials. By employing the insert 30 of the present invention to allow the longest nozzle 12 to flex its associated insert 30 and to continue travel toward the injection gate 16, each nozzle 12 of the multi-cavity injection system is able to come into contact with its associated insert 30 consistent with the objectives of the present invention. Each nozzle 12 will preferably contact the associated insert 30 firmly enough to prevent the escape of melt material from therebetween. Melt material buildup between the nozzle 12 and the insert 30 is thus prevented and the above-discussed tolerances may be maintained.

Although each insert 30 will likely flex a different amount, the depth of the space 86 (i.e. the distance between the plane defined by the outer land 78 and the central portion 80) may be designed to accommodate both the longest and shortest nozzle 12 allowed by tolerance so that all nozzles 12 may firmly contact the respective insert 30 according to the present invention. That is, the depth of space 86 could equal the difference between the longest nozzle 12 allowed by tolerance and the shortest nozzle 12 allowed by tolerance at operating temperatures. In this embodiment, the depth of the space 86 would be dictated by the system into which the insert 30 is incorporated. In one embodiment a depth of 0.015 inch was found to provide sufficient depth for the space 86 in a multicavity injection apparatus. Also, a thickness of 0.049 inches for the flex portion 88 when having a diameter of 0.50 inches and the insert 30 is comprised of a material sold by DuPont under the trademark Vespel® has been found to provide flex portion 88 with sufficient flexibility consistent with the objectives of the present invention.

While the flex portion 88 of one or more insert 30 in a multi-cavity injection apparatus may contact the associated recessed flat 48 of the injection cavity 16 upon flexing, at least a portion of the space 86 will remain for other inserts. The space 86 may fill with melt material upon injection of melt material from the nozzle 12. However, thermal conduction from the nozzle 12 to the injection cavity 16 remains minimized by the relatively low thermal conductivity of the insert 30 despite the existence of melt material in the space 86.

In another embodiment, the diameter of the central flat 74 on the insert nozzle side 66 is configured to be larger than the diameter of the nozzle tip 44 in order to accommodate the lateral nozzle movement which occurs due to thermal expansion of the nozzle 12 during warm-up of some injection apparatuses. By configuring the diameter of the central flat 74 to be substantially larger than the diameter of the nozzle leading face 44 (as depicted in FIG. 1) the nozzle 12 is provided the freedom to move laterally across the central flat 74 without damaging either the nozzle 12 or the insert 30. It has been found that the lateral component of the nozzle 12 expansion may be as great as fifty thousandths of an inch. In one embodiment, the diameter of the central flat 74 is at least one hundred thousandths of an inch greater than the diameter of the nozzle leading face 44. In this embodiment, the nozzle tip 42 is allowed the requisite fifty thousandths of an inch of lateral movement in any direction from the central axis without the nozzle 12 contacting the insert outer ridge 72 or radius 76. In another embodiment, an insert 30 having a central flat diameter of 0.476 inches was found to operate properly, as defined herein, for a nozzle tip 42 having a 0.375 inch diameter.

From the foregoing description, it will be apparent that the injection apparatus of the present invention has a number of advantages, some of which have been described above and others of which are inherent in the apparatus of the present invention. Also, it will be understood that modifications can be made to the apparatus of the present invention without departing from the teachings of the invention. Accordingly the scope of the invention is only to be limited as necessitated by the accompanying claims.

We claim:

1. An insert for a multicavity injection apparatus comprising a plurality of injection nozzles, a plurality of injection cavities, one each associated with one of the plurality of injection nozzles and an insert located between at least one of the plurality of injection nozzles and the associated injection cavity, the insert comprising:
    an insert nozzle side for association with a leading face of the at least one of the plurality of injection nozzles;
    an insert cavity side for association with the associated injection cavity; and
    an axial bore extending as a through bore from the insert nozzle side to the insert cavity side;
    wherein, the insert nozzle side is configured to contact only the leading face of the at least one of the plurality of injection nozzles.

2. The insert of claim 1 wherein the insert cavity side further comprises a central flat.

3. The insert of claim 2 wherein the central flat is sized to allow lateral movement of the nozzle across the insert nozzle side.

4. The insert of claim 3 wherein the central flat comprises a diameter at least approximately 0.100 inches larger than the diameter of the nozzle leading face.

5. The insert of claim 3 wherein the central flat comprises a diameter of approximately 0.476 inches.

6. The insert of claim 1 wherein the insert cavity side comprises:
    an outer land for contacting the associated injection cavity adjacent to the injection gate; and
    a central recess extending from adjacent to the outer land to the axial bore;
        wherein the central recess is offset from the outer land to provide a space between the central recess and the adjacent one of the injection cavities.

7. The insert of claim 6 wherein the central recess provides a flexible portion of the insert for flexing under contact of the nozzle with the insert.

8. The insert of claim 7 wherein the insert flexible portion comprises a diameter of approximately 0.50 inches and a thickness of approximately 0.049 inches from the nozzle side to the cavity side.

9. The insert of claim 8 wherein the insert is comprised of titanium.

10. The insert of claim 7 the space between the flexible portion and the injection cavity is approximately 0.015 inches.

11. The insert of claim 1 wherein the insert is comprised of a low thermal conductivity.

12. The insert of claim 2 wherein the central flat extends substantially perpendicular to an axial bore of the at least one of the plurality of injection nozzles when the nozzle axial bore is substantially aligned with an axial bore of the insert.

13. The insert of claim 1 wherein the insert nozzle side is configured to allow lateral movement of the nozzle across the insert nozzle side.

14. An injection apparatus comprising:
    an injection nozzle;
    an injection cavity having an injection gate; and
    an insert between the injection nozzle and the injection cavity, the insert comprising an injection nozzle side for association with the injection nozzle and an injection cavity side for association with the injection cavity, the injection nozzle being free to travel laterally across the injection nozzle side of the insert.

15. The apparatus of claim 14, the insert nozzle side is configured to contact only a leading face of the injection nozzle.

16. The apparatus of claim 14 the insert injection nozzle side comprising a central flat extending from an insert axial bore for contacting the nozzle leading face.

17. The apparatus of claim 16 wherein the insert central flat extends at least approximately 0.050 inches in any direction from a perimeter of the injection nozzle leading face when the apparatus is at operating temperature.

18. The apparatus of claim 17 wherein the insert central flat comprises a diameter of at least approximately 0.476 inches.

19. The apparatus of claim 14 wherein the insert cavity side comprises an outer land contacting the injection cavity adjacent to the injection gate and a central recess spaced from the injection cavity allowing an insert flexible portion to flex toward the injection cavity under contact of the nozzle with the insert.

20. The apparatus of claim 19 wherein the insert flexible portion comprises a diameter of approximately 0.50 inches and a thickness of approximately 0.049 inches from the nozzle side to the cavity side.

21. The apparatus of claim 19 wherein the central recess is spaced approximately 0.015 inches from the injection cavity.

22. The apparatus of claim 14 wherein the injection cavity comprises a recess and the insert is removably located within the recess such that an axial bore of the insert is substantially axially aligned with the injection gate.

23. The apparatus of claim 22 wherein the injection cavity comprises cooling ducts proximate to the injection gate.

24. The apparatus of claim 22 wherein a flow channel of the injection nozzle is in substantial axial alignment with the insert axial bore when the apparatus is at operating temperature and the injection nozzle is in substantially forced contact with the insert to prevent the leakage of a melt material from between the nozzle and the insert.

25. The apparatus of claim 14 wherein the insert of comprised of a low thermal conductivity relative to the injection nozzle.

26. The apparatus of claim 16 wherein the insert central flat extends substantially planarly from the insert axial bore.

27. The apparatus of claim 26 wherein the central flat extends substantially perpendicular to an axial bore of the injection nozzle when the injection nozzle axial bore is substantially aligned with the insert axial bore.

* * * * *